Sept. 5, 1939.         R. D. PARRY            2,172,013
                        BREAD TRAY.
                       Filed Oct. 6, 1937
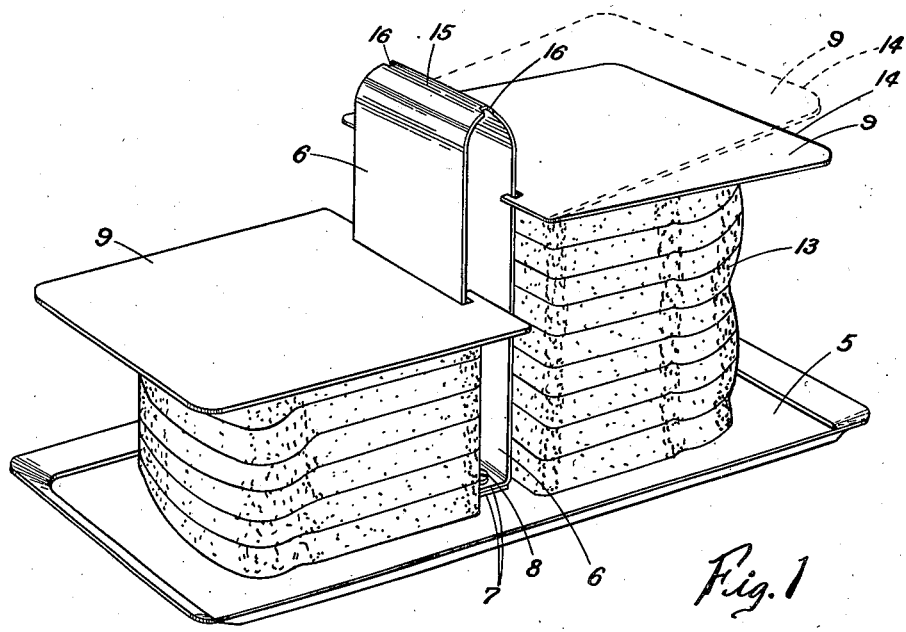
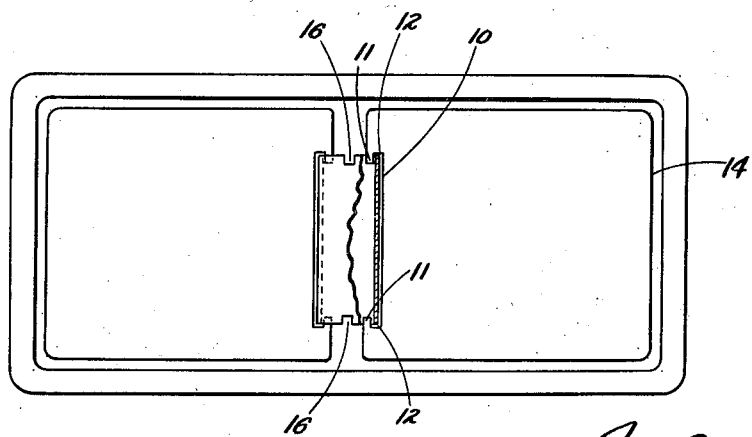
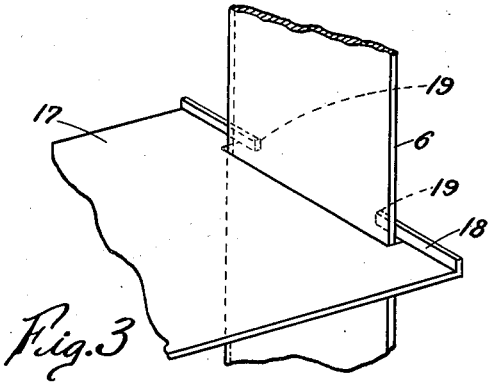
INVENTOR.
Robert D. Parry
BY
ATTORNEYS Patented Sept. 5, 1939

2,172,013

UNITED STATES PATENT OFFICE 2,172,013

BREAD TRAY

Robert D. Parry, Cincinnati, Ohio, assignor of one-half to Wiley W. Osborne, Cincinnati, Ohio Application October 6, 1937, Serial No. 167,605

3 Claims. (Cl. 65—59)

The present invention relates to trays or servers for sliced bread or other articles, and has for its principal object the provision of a device for protecting such articles against drying out and against contamination by air-borne particles, and at the same time rendering the contents of the tray easily accessible but subject to automatic protection.

Another object of the invention is to provide a device of this character that is adapted to simple construction in a wide variety of attractive forms.

Another object of the invention is to provide a bread server which is easily kept clean.

These and other objects are attained by the means herein described and exemplified in the accompanying drawing, in which:

Fig. 1 is a perspective view of a device of the invention containing sliced bread, and showing in dotted lines the position of a movable member thereof during the removal of a slice of bread.

Fig. 2 is a top plan view of the device of Fig. 1.

Fig. 3 is a fragmental perspective view of a modified form of movable member and its support.

It has been found that a stack of sliced bread substantially sealed at opposite ends of the stack and under very gentle pressure will remain fresh and free from contamination for a long period. The present invention provides for the convenient handling of bread and other sliced foods and at the same time taking advantage of the foregoing fact.

The device of the invention is readily adaptable to various forms and may be made of such materials as are impervious to air, or substantially so, and which do not affect, and are not affected by, the bread or other food stuffs placed therein. The device may be made of plated metals, suitable plastic materials, glass or vitreous materials, or several of them. In the embodiment illustrated, the device comprises a tray or base 5 (preferably of plated metalware) which has mounted intermediate its ends an upright guide of suitable construction. In the embodiment shown, the guide is formed by an inverted U-shaped metal strip providing a pair of legs 6 secured at the bottom portions 7 thereof by any suitable means such as spot welding, rivets or screws 8. The cover plate members 9 are, in the present embodiment, formed of polished or plated sheet metal and are provided on one edge with an elongated slot or opening 10 providing a pair of opposed lugs 11, each bounding one side of an adjacent notch 12. The leg 6 of the upright is received in the opening 10 with its edges extending loosely into the opposed notches 12 so that cover plate members 9 may be gravitationally urged towards the base or tray 5 and will thus cover the top face of an interposed stack of bread slices such as at 13. The width of notches 12 in relation to the thickness of the leg 6 of the upright is such that the outer edge 14 of the cover plate member 9 may be raised to afford ready access to the top slices of bread in the stack. Upon removal of a slice of bread, the cover plate member 9 drops by gravity to the top of the remaining stack of bread slices and assumes a position completely covering the face of the top bread slice. The stack of bread slices is compressed mildly due to the weight of the cover plate 9 but sufficiently to preclude escape of the moisture content from the bread in a dry or warm atmosphere. The natural freshness of the stack of bread slices in a device of this invention provides for a longer time than would be expected, viz., two or three days or longer, if the device is left exposed to normal room conditions.

For the purpose of facilitating assembly of the device and removal of the cover plates for cleaning purposes, the extreme top of the inverted U-shaped bent portion 15 is notched at opposite sides as at 16 in order to permit the lugs 11 of the cover plate to be passed about the rear or inside faces of leg 6. The device shown in Figs. 1 and 2 is arranged so that the cover plate 9 will automatically and gravitationally drop to cover the top face of interposed slices of bread.

In the modified form of the device illustrated, fragmentally in Fig. 3, the form of cover plate is modified by providing a cover plate 17 having an upstanding flange 18 which projects beyond the opening which receives the leg 6 of the upright and forms at each side of the plate a lug 19 which can be caused to frictionally bind the cover plate in a substantially horizontal position at any elevation along the leg 6. In his form of the device, the automatic covering of the top slices of bread, as obtained in the preferred form shown in Figs. 1 and 2, is sacrificed in order to render the bread slices accessible without the necessity of tilting the cover plate.

The operation of the device shown in Fig. 1 is as follows: Assuming the cover plates to have been previously removed, a stack of sliced bread is placed conveniently on the base or tray at a short distance from the adjacent leg of the upright member and the cover plate is then associated with the upright by passing the notches 11 through the slots 16 of the upright and allowing the plate to drop into position covering the top of the stack. The crust portion of the stack of bread slices is visible and exposed. A user, desiring to remove a portion of bread, would reach for the bread in practically a normal casual manner, but would place the knuckles or tops of the fingers below the projecting portion of the cover member and would thus lift or tilt said member to a suitable angle (viz., as shown in Fig. 1). The top slice of bread is then removed in any casual manner, the user thereafter substantially ignoring the cover plate and allowing it to fall into position as the hand and the slice of bread are drawn away.

In a modified form shown in Fig. 2, the cover plate 17 would require lifting, at least slightly, to permit a slice of bread to be removed and the cover plate would remain frictionally bound in its elevated position after the bread had been extracted. This form of the device would be preferred for use on serving counters in eating places where the attendants may desire to leave the bread stack substantially uncovered for a short time during rush periods. The bread would be again securely covered by a slight pressure exerted on plate 17 close to leg 6.

What is claimed is:

1. In a bread tray the combination of a horizontal base member for the reception of stacked, sliced bread, a flat cover member having a notch in one edge for seating on and completely covering the topmost face of a stack of bread slices on said base member, and vertical guide means secured to the base member and loosely engaged in the notch in said cover member at one edge of said cover member and permitting vertical raising and lowering movement of the cover member and also tilting thereof on said guide means.

2. In combination a base, an inverted U-shaped strip secured at its bottom ends to said base, said strip being notched at its opposite edges at the top of the U-shaped bend, a plate apertured along one edge to receive said strip and lugs on said plate embracing the edges of the strip to effect free vertical guiding and tilting of the plate on the strip, said plate being movable to vertical position above the U-shaped bend whereby the lugs on the plate may pass through the notches in said strip.

3. In a bread tray structure, a flat base, a vertical guide member fixed on the base and a flat cover plate having a T-shaped notch in one edge only thereof for free tilting and vertical guiding movement of the plate on the guide member.

ROBERT D. PARRY.